Figure 1:
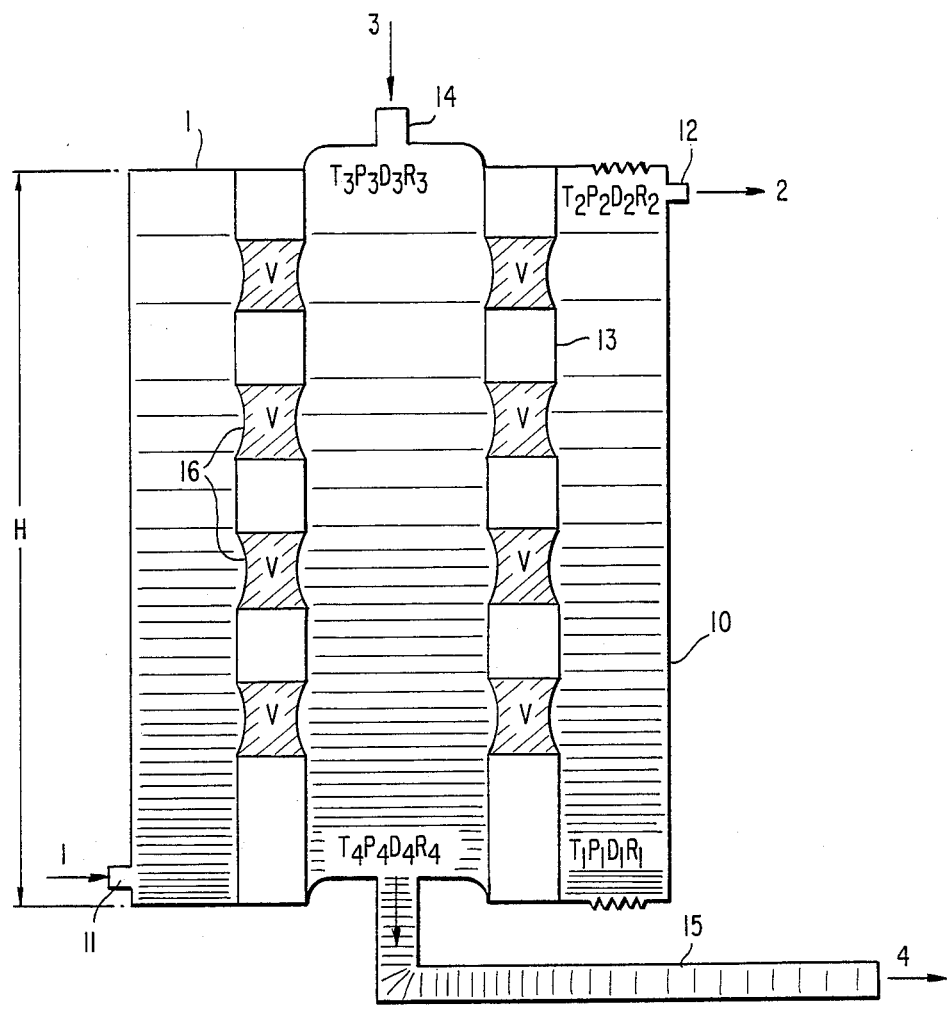

United States Patent [19]

Ford

[11] Patent Number: 4,743,378
[45] Date of Patent: May 10, 1988

[54] RAPID VAPOR TRANSPORT THROUGH UNWETTED POROUS BARRIERS

[75] Inventor: Douglas L. Ford, Eastwood, Australia

[73] Assignee: Memtec Limited, New South Wales, Australia

[21] Appl. No.: 945,672

[22] PCT Filed: Mar. 27, 1986

[86] PCT No.: PCT/AU86/00081
§ 371 Date: Nov. 17, 1986
§ 102(e) Date: Nov. 17, 1986

[87] PCT Pub. No.: WO86/05706
PCT Pub. Date: Oct. 9, 1986

[30] Foreign Application Priority Data

Mar. 28, 1985 [AU] Australia .................. PG9948
Apr. 4, 1985 [AU] Australia .................. PH0018

[51] Int. Cl.⁴ .................................... E01D 13/00
[52] U.S. Cl. ............................... 210/640; 203/11; 203/99; 203/DIG. 17
[58] Field of Search ............ 210/640, 500.2, 490; 159/DIG. 27, 174; 55/158; 203/10, 11, 99, DIG. 17; 202/174, 173, 236, 266

[56] References Cited

U.S. PATENT DOCUMENTS 4,476,024 10/1984 Cheng ................... 159/DIG. 27

FOREIGN PATENT DOCUMENTS

A2,59-105808 6/1984 Japan .
A2,60-64603 4/1985 Japan .
A2,60-206409 10/1985 Japan .
83/02004 8/1984 PCT Int'l Appl .

*Primary Examiner*—Frank Sever
*Attorney, Agent, or Firm*—Oblon, Fisher, Spivak, McClelland & Maier

[57] ABSTRACT

A method of increasing the rate the transport of volatiles through porous barriers (13) such as membranes consists of subjecting the porous barriers (13) to a vacuum for sufficient time to remove any permanent gas from the pores (V), admitting a non-wetting liquid through inlet (14) to the barrier (13) either before or during the application of the vacuum whereby the non-wetting liquid forms films or bubbles (16) which seal the pores (V) to create a low pressure region within each pore (V) which is filled with vapor of the non-wetting liquid. The invention may be used to transport volatiles such as ethanol across a membrane and to transfer heat across a membrane.

15 Claims, 1 Drawing Sheet

RAPID VAPOR TRANSPORT THROUGH UNWETTED POROUS BARRIERS

FIELD OF INVENTION

This invention relates to the rapid transport of vapour through unwetted porous barriers.

The invention may be applied to a wide variety of porous separating devices which may be in the form of sheets, tubes or hollow fibres. Such devices are widely used in microfiltration, ultrafiltration, dialysis, electrodialysis, diffusion, pervaporation, osmosis and reverse osmosis where separations are made by selective permeation through relatively thin porous barriers or layers. For the sake of brevity, such devices shall be referred to as "porous barriers".

BACKGROUND ART

The invention has application to the distillation of aqueous solutions through microporous hydrophobic membranes whose pore sizes usually range from 0.001 to 10 microns in diameter. The present state of the art is that no manufacturer offers a recommended multiple effect water still which depends on hydrophobic porous barriers and transmembrane evaporation beyond laboratory experimental size.

Practical problems which arise in the design of stills include the high energy use of single effect stills, fouling-induced hydrophilic break-throughs, difficulty in applying feed to the hydrophobic pore entrances, solute polarisation and crystallization in the pores as well as the low rates of diffusion through the long pores of the barriers. These problems have impeded commercial development of membrane distillation.

Some progress has been made in overcoming many of the above problems by coating hydrophobic porous hollow fibre barriers with woven or cast porous coatings which are usually very thin and hydrophilic. However, poor energy efficiency due to difficulty in achieving multistage operation and the low rates of vapour transport through the fibres have remained as prime limitations to commercial acceptance.

The multistage countercurrent flow of hot feed which directly distills into the cold condensate stream is most easily achieved by the use of porous, hydrophobic hollow fibres with very thin walls. There is however, still a difficulty in providing a heat exchanger to recover the heat content of the now hot condensate to reheat the now colder evaporation residue stream. This remains a difficulty and continues to necessitate some form of heat exchanger of large area. There is an economic balance between the cost of the heat energy and the costs added by the heat exchanger.

In some circumstances, the heat is available as waste, but the low rate of vapour transfer through the necessarily fine pores limits the utilization of the otherwise favourable application. The slowness of the vapour transfer is explicable and expected.

Commonly, the tortuous pore path of 200 to 600 microns consists of 0.2 micron diameter pores — a 1000 to 3000 fold ratio of length to diameter. Some non-condensable or permanent gas is always in the pores and the rates of water vapour diffusion through these gases are low.

Hitherto, the best that could be done was to feed a degassed hot aqueous feed. The diffusing water carried the air entrapped in the pores very slowly out into the cold condensate stream where the air dissolved.

European Patent EP No. 94543 (1983) discloses the methods of heating near to boiling to gain enough vapour pressure to increase diffusion rates. Thermolabile liquids such as milk and beer cannot be treated at high temperatures and cannot be boiled at lower pressures without distilling the volatiles out of the system or reducing the partial pressure of the vapour, which defeats the original purpose of heating to boiling.

DISCLOSURE OF INVENTION

In broad terms, the invention is concerned with a method of increasing the rate of transport of volatiles through unwetted porous barriers by trapping a region of low pressure in all the pores, which are substantially freed of permanent gas, by applying a vacuum and then sealing the pores by opposing film or bubbles of non-wetting liquid so that vapour transport is aerodynamic and not diffusive and by the re-application of vacuum and surface treatment as needed to renew hydrophobicity or hydrophilicity as required. Hydrophobic treatments include drying, azeotropic drying and trimethylsilyl chloride treatment.

The prior art has not recognised the practicality of using surface tension forces to hold a vacuum in the pores nor the practicality of rapidly regenerating the vacuum if it is lost due to ingress of permanent gas by periodically applying a vacuum and then permitting non-wetting liquids to re-seal the pores by surface tension without undue ingress of liquid. In this invention vapour transport is aerodynamic and not diffusive through gas or plastic as in the prior art.

According to the invention there is provided a method of increasing the rate of transport of volatiles through unwetted porous barriers, said method comprising the steps of:

(a) subjecting the unwetted porous barrier to a vacuum for sufficient time to remove any permanent gas from the pores, (b) admitting water or other non-wetting liquid to the barrier either before or during the application of the vacuum, (c) releasing the vacuum whereby the non-wetting liquid forms films or bubbles which seal the pores to create a low pressure region within each pore which is filled with vapour of the non-wetting liquid.

EXAMPLES OF EMBODIMENTS OF THE INVENTION

The invention will now be described by reference to the following examples.

EXAMPLE 1

The broad application of the invention is illustrated by the simplicity with which a long standing problem of minutely characterising the pore size distributions of porous barriers can be solved.

Many elaborate types of apparatus have been devised in an attempt to elucidate this unsolved problem. The largest pore size is often measured by the "bubble point" method of ASTM 317-70 (reapproved 1977) of the American Society of Testing Methods.

The bubble point is the pressure needed to move the first bubble of gas through the porous barrier when wetted with a liquid of known surface tension. West German Pat. No. 3,312,729 describes accurate apparatus for bubble point measurement for pore sizes in the range from 0.001 to 10 microns.

Overall pore size distribution can be obtained with a wide range of pressure porosimeters; but the local variations are not measured since even the more accurate devices average over one to two square meters of the barrier surface.

All known methods of characterising pore size distributions give overall average statistics. For example, there is no published information on the microheterogeneity of a small sample of porous hollow fibre of polypropylene with 200 micron bore and 200 micron porous walls and the speed of volatile transport in small local areas.

In this example, the fibres were dropped into water in a tube which was then evacuated until the water boiled. The vacuum was then released to seal in low pressure water vapour. A solution of ammonium hydroxide was then forced through the lumens of the fibres. Liquid could not pass through the unwetted porous barrier walls, but, water vapour and ammonia gas did diffuse through the pores of the fibres.

Nessler's potassium mercuri-iodide reagent was applied to the outside of the fibres and the place and speed of ammonia gas transport was noted by the location and intensity of the characteristic brown precipitate at each pore exit. Many commerical porous fibres were seen to be extremely heterogeneous, often with an impermeable surface glaze in patches and longitudinal streaks.

Very tellingly, a blank untreated fibre exhibited the same effects but 5 to 20 times more slowly. The untreated fibre had not caught up to the evacuated sample even after 24 hours.

Vapour transport by aerodynamic flow in the absence of permanent gases is much faster than diffusion through the permanent gas and the liquid seals keep out these gases for considerable periods. These periods are lengthened by removing permanent gases by de-gassing treatments, such as boiling under vacuum, but regeneration is so simple that only with aerated beverages does de-gassing seem necessary. The effectiveness of the method of the invention is highlighted by the 2 to 20 times faster transport of the ammonia gas through the evacuated pores compared to air-filled pores. The rate increase is greater when the pore paths are long.

EXAMPLE 2

The method of the invention was used to remove alcohol from beer, wine and aqueous ethanol that was sufficiently dilute so as not to wet the microporous poly (tetrafluoroethylene) barriers used. With good barriers, up to 30-35% ethanol can be treated without wetting the pores of the barrier and thereby causing hydraulic flow.

Above about 40-45% ethanol (when the surface tension is 27-30 dynes/cm) the condensate wetted the walls of the pores of the barriers and it was necessary to suppress the surface activity of the ethanol on the condensate side of the barrier. This was done by absorption in water by countercurrent operation. Other aqueous solutions were used including 70-85% sulphuric acid which is a good absorbent and which allowed concentrated ethanol to be distilled off. The acid was then recovered by vacuum heating.

Concentrated salt solutions such as calcium chloride, lithium bromide or magnesium nitrate were also effective.

Although recovery of ethanol from dilute solutions is well known, it is the above transport process for the ethanol that is novel. An advantage in making low alcohol beers at room temperature or even lower by cooling the absorbent is that flavours are retained.

EXAMPLE 3

Countercurrent operation of water distillation with a microporous polypropylene cartridge of one square meter lumen wall area was about twice as rapid judged by overall heat transfer when the air was removed from the pores of the polypropylene fibres but fell back to the untreated blank in one hour because of inadequate degassing of the 40° C. to 60° C. feedwater. Heat transfer rate was an average of 0.005 cal/cm$^2$/cm/C/sec which is about four times that for liquid water heat transfer and much higher than gas film heat transfer. A nonvolatile dye, alkaline phenolphthalein, was added to the hot water and no trace of dye passed into the cold water, proving that no heat was transferred directly through the microporous polypropylene as liquid hot water.

EXAMPLE 4

Difficulty was experienced in keeping a hydrophilic porous barrier unwet with oil or fluorocarbons. The feed and distillate streams needed saturation with water to prevent drying out. However, a hydrophilic nylon 6 microfilter wetted with glycerol and sodium polystyrenesulphonate solutions proved a suitable barrier in which a region of low pressure containing fluorocarbon 113 vapour could be held. It was possible to distill volatile hydrophobic hydrocarbons and fluorocarbons from less volatile oils. The invention thus appears to be operative in this reversed phase operation. At these low temperatures and pressures many lipophilic hydrocarbon separations are facilitated and azeotropes are often broken. These advantages are well documented in hydrocarbon processing.

EXAMPLE 5

The ASTM Bubble Point of a polypropylene porous hollow fibre was found by temporarily wetting with ethanol, well washing with water and then applying internal air pressure while horizontal under water in a tray. It is to be noted that only one air/water interface exists as the air pushes the water out of a pore and becomes visible.

The bubble point was 150 kPa at the pore exit of the transmembrane path that possesses, in cross-section throughout its length, a greater ratio of corresponding surface to minimum perimeter than any other path. The fibre was then treated by boiling under vacuum for one minute at 25° C. under water, followed by release of the vacuum to trap a region of reduced presssure in the pores by water bubbles.

Internal air pressure was re-applied but now pushed three liquid/gas interfaces. The bubble point was 400 kPa (almost three times the original bubble pressure) and was not at the previous position. The pores are extremely varied in diameter along their tortuous, long pathways and the three interfaces first pushed out now have the lowest sum of pressure resistance arising from the three individual liquid/gas and gas/liquid interfaces each of which needs pressure to move that interface and which pressure now depends on the position of all three interfaces because the pore diameter varies along its length.

Only if the original bubble point pore site is a large anomalous leak, unrelated to the normal pore size distribution so that its effect is overwhelming, would the new group of three spatially connected interfaces now moveable with minimum pressure be expected to include the original bubble site. This result of changed bubble point position totally confirms the postulated mechanism of low pressure trapping of a region by liquid seals. The bubble point did not drop appreciably but appeared in yet another place in 20 hours again confirming the postulated bubble trapping mechanism in a system of complex, interconnected, variable size pores.

EXAMPLE 6

FIG. 1 is a simplifed schematic view of a countercurrent fibre still in accordance with one embodiment of the invention. The vessel 10 has an inlet 11, outlet 12 and a fibre 13 having a lumenal inlet 14 and a lumenal outlet 15. The horizontal lines in FIG. 1 are isothermal contours. Each pore V of the fibre 13 has a non-wetting meniscus of bubble 16 and each pore contains low pressure, saturated water vapour but no air. Hot aqueous solution enters outside the fibre in the direction of arrow 1 at rate R1, temperature T1, pressure P1 and density D1 and distils through the pores V in the Fibre 13.

Countercurrent cold pure water enters the fibre lumen in the direction of arrow 3 at rate R3, temperature T3, pressure P3, density D3, and increases in volume and temperature as the water vapour rapidly transfers through the air-free regions of rarefied water vapour V. Output from the lumens emerges in the direction of arrow 4 and output from the vessel 10 emerges in the direction of arrow 2. The following quantitative relationships apply in FIG. 1:

(a) $R1 > R2$; $R4 > R3$
(b) $R1 + R3 = R2 + R4$
(c) $T1 > T4 > T2 > T3$
(d) $P4 = P3 + H(D3 + D4)/2$
(e) $P1 = P2 + H(D1 + D2)/2$
(f) $R1T1 + R3T3 = R2T2 + R4T4$
(g) $R1D1 + R3D3 = R2D2 + R4D4$ where:
R represents flow rate
T represents temperature
P represents pressure
D represents density The fibres were 2500 in number of length 50 cm and internal bore 200 micron and outside diameter 600 micron and of average pore size 0.2 microns. Solution at 44.5° C. at 120 liter/minute (R1) dyed with non-volatile Congo red was circulated through the shell side of the fibres and cooled to 43° C. when 12 liter/minute of water at 23° C. was passed into the lumen header 14. The temperature at the lumen outlet 15 rose to 38° C. was required by the heat balance and the absence of any colour proved no hot water permeated the porous fibre. The point to be made is that a log mean temperature difference of only 7.5° C. was needed. Heat transfer is very rapid so that even small temperature differences between the inside and the outside of the fibres cause much heat to flow because the mechanism of heat transfer is different and more efficient. The new mechanism is the fast flow of rarefied low temperature steam.

What is claimed is:

1. A method of increasing the rate of transport of volatiles through an unwetted porous barrier, comprising enabling aerodynamic transport through the porous barrier by:

(a) subjecting the unwetted porous barrier to a vacuum for a time sufficient to remove any permanent gas from the pores,
(b) admitting a non-wetting liquid to the barrier either before or during the application of the vacuum, and
(c) releasing the vacuum, whereby the non-wetting liquid forms films or bubbles which seal the pores to create a low pressure region within each pore which is filled with vapor of the non-wetting liquid.

2. The method according to claim 1, which comprises periodically subjecting the porous barrier to the vacuum and a non-wetting liquid to re-seal any pores in which the low pressure region is lost due to ingress of gas.

3. The method according to claim 1, which further comprises treating the barrier to render the same hydrophobic.

4. The method according to claim 3, wherein the hydrophobic treatment is selected from the group consisting of drying, azeotropic drying and treatment with trimethylsilyl chloride.

5. The method according to claim 1, wherein said non-wetting liquid is water.

6. A method comprising transporting volatiles through an unwetted porous barrier with an increased rate of transport by aerodynamic transport of vapor through the barrier, by:

(a) subjecting the unwetted porous barrier to a vacuum for a time sufficient to remove any permanent gas from the pores,
(b) admitting a non-wetting liquid to the barrier either before or during the application of the vacuum,
(c) releasing the vacuum, whereby the non-wetting liquid forms films or bubbles which seal the pores to create a low pressure region within each pore which is filled with vapor of the non-wetting liquid,
(d) applying a feed containing the volatile to one surface of the barrier, and
(e) collecting the volatiles at the other surface of the barrier.

7. The method according to claim 6, wherein the surface activity of the volatile on the other, or condensate, surface of the barrier is suppressed.

8. The method according to claim 7, wherein the surface activity suppression is achieved by absorption in an aqueous solution.

9. The method according to claim 8, wherein the surface activity suppression is carried out as a countercurrent operation.

10. The method according to any one of claims 6 to 9, wherein the volatile is ethanol, the feed is beer, wine or aqueous ethanol.

11. The method according to claim 10, wherein the surface activity of the ethanol on the other, or condensate, surface of the barrier is suppressed by absorption in sulphuric acid.

12. The method according to claim 11, wherein said non-wetting liquid is water.

13. The method according to claim 6, wherein said non-wetting liquid is water.

14. A method of heat transfer comprising using aerodynamic transport of volatiles through an unwetted porous barrier, by;

(a) subjecting the unwetted porous barrier to a vacuum for a time sufficient to remove any permanent gas from the pores,
(b) admitting a non-wetting liquid to the barrier either before or during the application of the vacuum,
(c) releasing the vacuum, whereby the non-wetting liquid forms films or bubbles which seal the pores to create a low pressure region within each pore which is filled with vapor of the non-wetting liquid,
(d) applying a hot feed containing the volatile to one surface of the barrier, and
(e) collecting the volatiles at the other surface of the barrier using a flow of fluid.

15. The method of heat transfer according to claim 14, wherein the hot feed is water and the collecting fluid is water at a lower temperature.

* * * * *